Nov. 17, 1970     D. COHN     3,541,304
ELECTRIC FLUID HEATER
Filed March 18, 1968     2 Sheets-Sheet 2
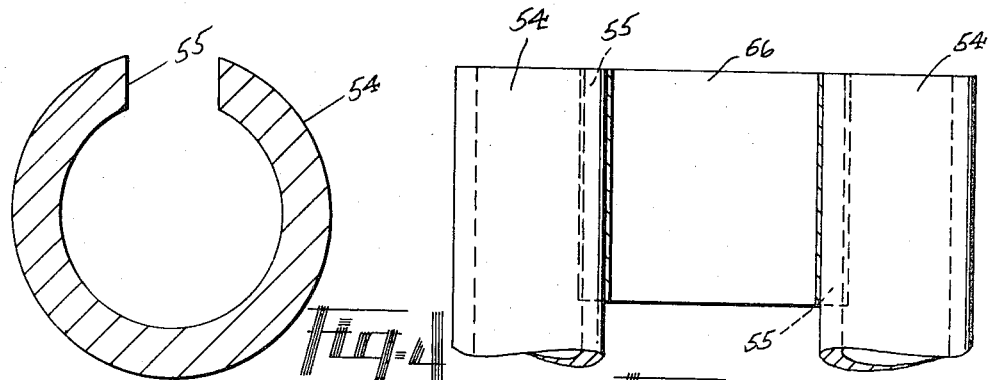
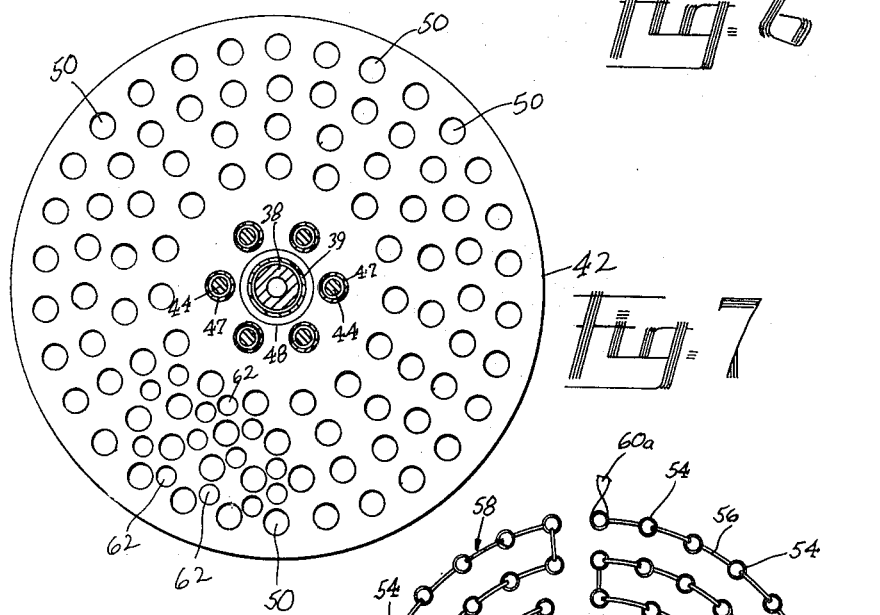
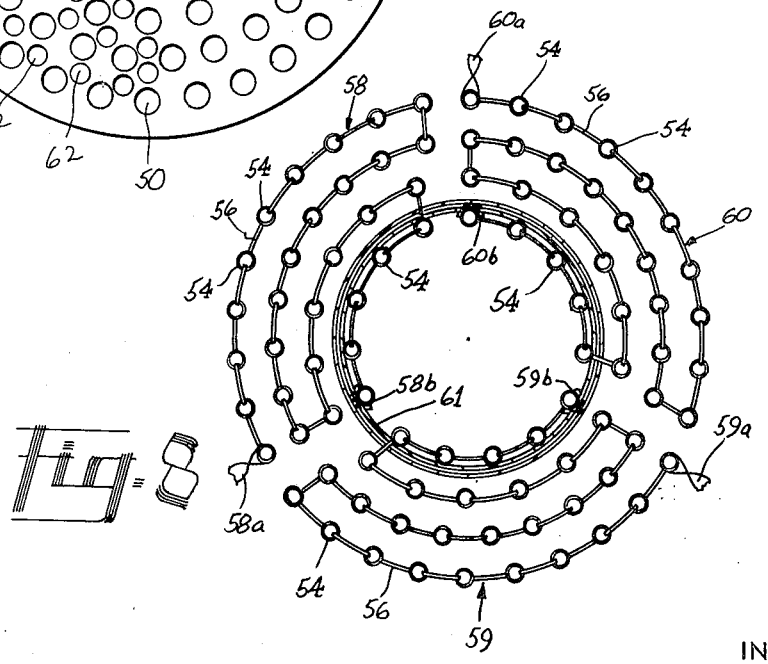
INVENTOR/S
DITER COHN,
BY *Melville, Strasser, Foster and Hoffman*
ATTORNEYS United States Patent Office 3,541,304
Patented Nov. 17, 1970

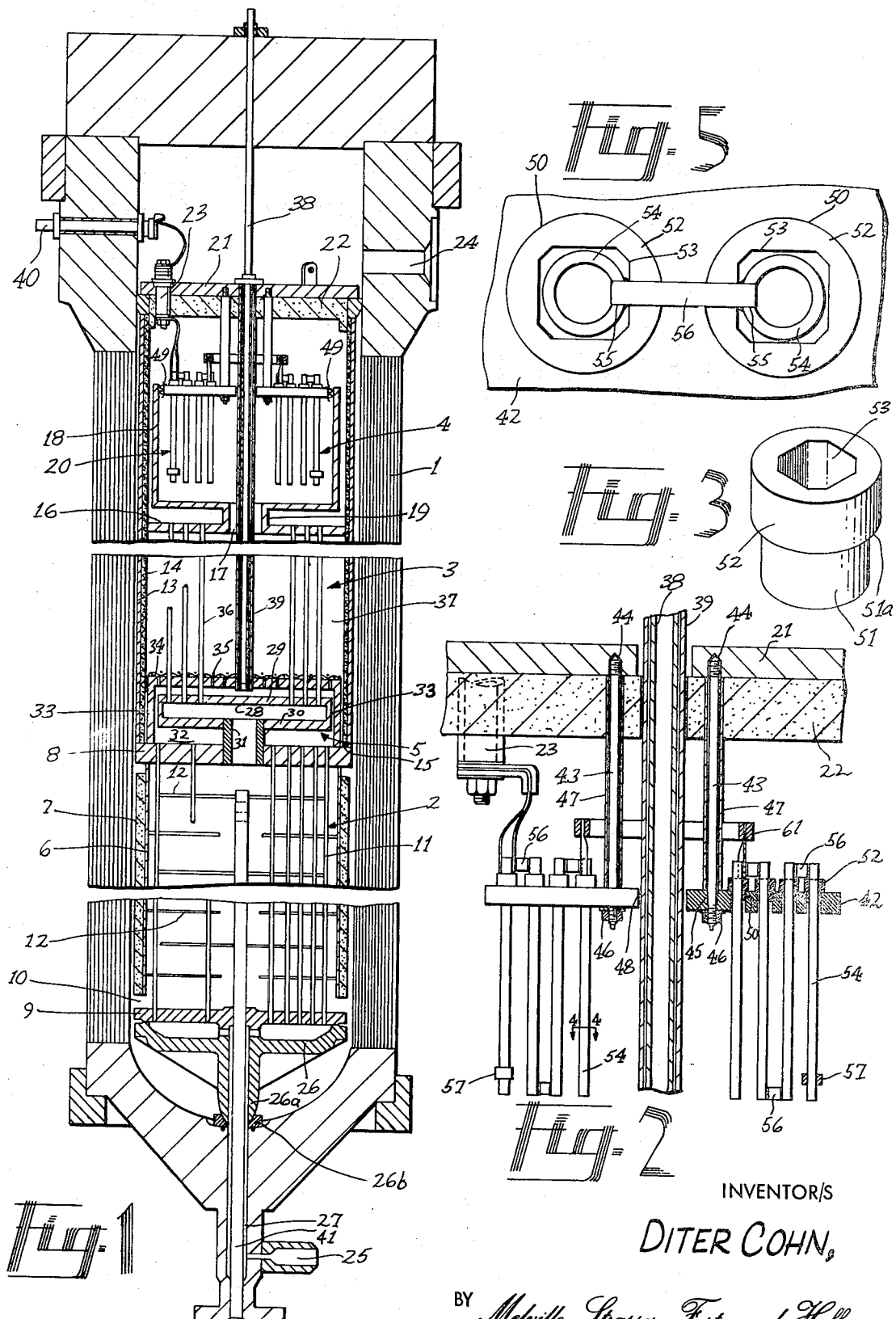

3,541,304
ELECTRIC FLUID HEATER
Diter Cohn, Houston, Tex.
Filed Mar. 18, 1968, Ser. No. 713,767
Int. Cl. H05b 3/00
U.S. Cl. 219—374    7 Claims

ABSTRACT OF THE DISCLOSURE

An electric heater for heating gases and electrically non-conductive liquids comprising a plurality of slotted cylindrical heating elements suspended in spaced relationship from a support plate by ceramic insulators. Means are provided whereby gas to be heated is passed through and about the cylindrical heating elements. The heating elements are connected in series, and are additionally connected to a suitable source of electrical current.

BACKGROUND OF THE INVENTION

Field of the invention

The invention relates to an electric heating device, and more particularly to a heating device suitable for heating fluids. As used herein, and in the claims, the term "fluid" is intended to encompass any gas and any electrically non-conductive liquid.

Description of the prior art

The heating device of the present invention is not limited as to its application, but for purposes of an exemplary showing will be described with respect to its use as a start-up heater for a converter in the production of ammonia, methanol, and the like.

The production of ammonia, for example, is accomplished by a catalyzed conversion reaction which takes place at an elevated temperature and pressure in a vessel commonly referred to as a converter. The conversion reaction is exothermic, and the reaction is therefore self-sustaining once the proper temperature of the reactants has been reached. The heating of the reactants to the proper temperature is accomplished by the use of a start-up heater. Once the reaction is established, the heater is turned off.

Since the start-up heater is used for the sole purpose of initiating the reaction, the normal practice is to size the heater with a heat capacity slightly in excess of the minimum reactant gas flow required to establish the reaction. In this way, the size of the heater is reduced to a minimum. This is an important consideration since the heater is installed within an expensive high pressure vessel. Should the heater size require the vessel to be increased in size, great additional expense would be entailed.

Heretofore, the start-up heater of an ammonia converter has usually comprised three heating elements, each in an archimedean spiral arrangement, located one above the other. Most such heaters were operated on three-phase current, each heating element being connected to one-phase of the three-phase current supply.

While such heating devices have been widely used, they are characterized by certain deficiencies. For example, because of the high watt density and non-uniform gas flow, failures of the electrical elements due to overheating are not uncommon. Loss of one phase, while seriously hampering operations, does not preclude continuing operation of the converter. Loss of two or three phases, however, will require replacement of the unit, a difficult and expensive procedure.

These prior art heating devices tend to fail at the points of highest temperature, i.e., where the spirals pass through the insulators. This is most prevalent in the first phase coil due to non-uniform distribution of gas flow and is further aggravated in the second phase coil, which is shielded by the first and third phase coils, located directly above and below. A number of efforts to correct this situation have been made. For example, a distribution baffle has been located directly below the heating device in an effort to promote more uniform gas flow over the coils. Such efforts, however, have not met with great success.

The heater of the present invention is adapted to overcome the objections inherent in the prior art design. The heater of the present invention is constructed from standard and easily fabricated parts, with assembly, machining and repair problems minimized. The instant heater is cheaper to build, easier to maintain, and is characterized by a far lower wattage loading per surface area. The heater of the present invention will readily fit into the same space within the converter heretofore occupied by the archimedean pancake design. In accordance with the present design, far less of the available space will be occupied by supporting means for the heating elements.

SUMMARY OF THE INVENTION

The heating device of the present invention comprises a plurality of slotted, hollow, cylindrical heating elements which are supported in vertical, parallel spaced relationship by ceramic insulators located in a horizontal support plate. The cylindrical heating elements pass through non-circular perforations in the ceramic insulators so that the gas to be heated may pass downwardly through the cylindrical heating elements and along the outside surfaces of the heating elements. The horizontal support plate may have additional perforations therein permitting gas to flow downwardly between the heating elements.

The vertically oriented heating elements are connected to one another by horizontal conductive strips affixed between adjacent elements. The strips are located alternately at the top and bottom of the elements so as to connect them in series. Where the heater of the present invention is to be connected to a three-phase current supply, the heating elements will be divided into three groups each covering substantially one-third of the area covered by the pattern of the element layout. The elements of each group will be connected in series as described. Each group will be connected to one leg of the conventional three-phase current supply.

BRIEF DESCRIPTION OF THE DRAWINGS

FIG. 1 is a fragmentary cross-sectional, elevational view of a conventional converter equipped with the heater of the present invention.

FIG. 2 is a fragmentary elevational view, partly in cross-section, illustrating the heater of the present invention.

FIG. 3 is a perspective view of an insulator of the present invention used to insulate a heating element from the supporting plate.

FIG. 4 is a cross-sectional view of a heating element of the present invention, taken along the section line 4—4 of FIG. 2.

FIG. 5 is a fragmentary plan view of the support plate, showing a pair of insulators and a pair of heating elements connected together.

FIG. 6 is a fragmentary elevational view of a pair of heating elements and a conductive connecting means.

FIG. 7 is a plan view of the support plate.

FIG. 8 is a plan view of the heating elements (with the support plate not shown) illustrating the manner in which three groups of the heating elements are connected together.

DESCRIPTION OF THE PREFERRED EMBODIMENTS

In the usual practice for the synthesis of ammonia, ammonia synthesis gas containing hydrogen and nitrogen in the desired ratio is delivered to an ammonia converter. A conversion of the synthesis gas into ammonia is effected during its passage through a catalyst bed in the converter.

FIG. 1 is a vertical cross sectional view of a conventional ammonia converter equipped with the heater of the present invention. The ammonia converter comprises an elongated shell 1 housing a heat exchanger generally indicated at 2, a catalyst basket generally indicated at 3, and a start-up heater generally indicated at 4. The heat exchanger and the catalyst basket are joined by a baffle assembly generally indicated at 5.

The heat exchanger 2 comprises a cylindrical member having a side wall 6 surrounded by insulative material 7, and surmounted by an upper tube sheet 8. At the bottom of the heat exchanger, a lower tube sheet 9 is provided, but is spaced as at 10 from the side wall 6 so as to permit passage of gas into the heat exchanger. A plurality of vertically oriented heat exchange tubes 11 pass through and are supported by the upper and lower tube sheets. The interior of the heat exchanger is also provided with a series of horizontally oriented baffles, indicated at 12.

The catalyst basket 3 is a cylindrical member having a side wall 13, the interior surface of which is covered by insulative material 14. The bottom edge of the side wall 13 is affixed to the tube sheet 8 as at 15. The upper portion of the catalyst basket is provided with a tube guide plate 16 having a central perforation 17 therein.

The heater means 4 is located above the catalyst basket and is surrounded on its sides and bottom by an enclosure means 18 which connects (as at 19) with the perforation 17 in the tube guide plate 16. The enclosure means 18 forms a heating chamber, generally indicated at 20. The catalyst basket wall 13 and its insulation 14 extend upwardly past the heater means and is closed by a cover plate 21 provided with a layer of heat insulation 22. Terminals for the heater means can be mounted on the plate 21 with electrically insulated feed-through connectors. One such terminal is indicated at 23.

The inlet for the ammonia converter is illustrated at 24 through the upper portion of the shell 1, and the outlet is illustrated at 25 in the bottom closure of the shell.

The lowermost surface of the lower tube sheet 9 may be provided with a lower tube sheet cover 26 connected about its edges to the tube sheet 9 in gas-tight fashion. The member 26 has a downwardly extending hollow support 26a which seals with machined bottom support 26b by means similar to a ball and socket joint. The support 26b is connected to a perforation 27 in the bottom closure member of the shell. The perforation 27 leads to the outlet 25.

The baffle assembly 5, located between the heat exchanger 2 and the catalyst bed 3 comprises an inner chamber 28. The inner chamber 28 is formed by an upper circular plate 29 having a downwardly extending peripheral flange, and a lower circular plate 30 having an upwardly extending peripheral flange. The peripheral flanges of the plates 29 and 30 are welded together to form the chamber 28. The chamber 28 is connected to the heat exchanger 2 by means of a conduit 31 extending through the lower plate 30 and the upper tube sheet 8. The inner chamber 28 is surrounded by an outer chamber 32. The outer chamber 32 is defined by the upper tube sheet 8, an annular wall member 33 and a circular plate 34. The plate 34 has a plurality of perforations 35 connecting the catalyst basket with the outer chamber 32. Vertically oriented catalyst cooling tubes 36 extend upwardly from the inner chamber 28 through the plates 29 and 34, the catalyst bed 37 and finally through the tube guide plate 16.

The ammonia converter may be provided with the traditional control elements, including a pyrometer tube 38 extending into the catalyst bed in a pyrometer tube well 39. External electrical connections for the heater 4 are generally indicated at 40. The converter may also be provided with a by-pass tube 31 whereby gas may be caused to enter the converter and pass directly into the baffle assembly 5, having bypassed the heat exchanger 2.

Briefly, in the operation of the ammonia converter, synthesis gas enters the converter shell 1 through the inlet 24. The synthesis gas flows downwardly in the annular space between the shell 1 and the catalyst basket wall 13. Continuing its travel, the gas flows downwardly between the shell 1 and the wall 6 and insulation 7 of the heat exchanger. When the synthesis gas reaches the annular opening 10, it enters the heat exchanger and flows upwardly about the heat exchange tubes 11 and around the baffles 12. The upwardly flowing synthesis gas enters the inner chamber 28 via the conduit 31. From the inner chamber 28, the gas passes upwardly through catalyst cooling tubes 36. At the upper end of the catalyst cooling tubes, the synthesis gas is caused to flow in the annular passage defined by the tube guide plate 16, the extension of the catalyst basket wall 13 and the member 18 surrounding the heating means. When the gas reaches the upper portion of the converter, enclosed by the plate 21 and its insulation 22, it begins its downward flow, first passing through the heating means 4 within the heating chamber 20. From the heating chamber the down flowing gas next passes through the perforation 17 in the tube guide plate 16 and into the catalyst bed 37. A baffle (not shown) may be provided to aid in dispersing the gas throughout the catalyst bed. As the gas passes through the catalyst an exothermic reaction takes place; but the temperature in the catalyst bed is controlled by the cooler synthesis gas passing upwardly through the catalyst cooling tubes. Having passed through the catalyst bed, the product gas enters the outer chamber 32 by means of the perforations 35. From the chamber 32, the product gas flows downwardly through the heat exchanger tubes 11. A heat exchange occurs between the gas flowing through these tubes and the upwardly flowing synthesis gas passing through the heat exchanger about the tubes. At the lower end of the heat exchanger tubes, the gas is directed by the lower tube sheet cover 26 to the perforation 27 and thence to the outlet 25. Additional temperature control within the converter can be effected by allowing additional synthesis gas to enter the converter through bypass tube 41. Since the gas entering the converter in this way bypasses the heat exchange section, the temperature of the gas passing through the catalyst cooling tubes is reduced. Thus, control of the maximum temperature in the catalyst bed may be accomplished.

As indicated above, the heater 4 is generally used primarily as a start-up heater. Once the reaction has begun, it will be self-sustaining and the heater 4 may be turned off.

The heater of the present invention is most clearly shown in FIG. 2. The heater comprises a support plate 42 (see also FIG. 7) which is suspended from the insulative catalyst basket cover 21 by means of a plurality of rods 43. The rods 43 are threaded at both ends. One end of each rod is threadedly engaged in perforations in the insulative cover plate 21, as at 44. The other end of each rod extends through perforations 45 in the support plate 42 and is provided with a nut 46. The spacing of the support plate 42 from the cover plate 21 is maintained by spacing tubes 47 surrounding the rods 43. The support plate may be made of any suitable material such as stainless steel or other heat-treated alloy.

The support plate 42 may have a central perforation 48 to permit passage therethrough of the pyrometer tube 38 and pyrometer tube well 39. In addition, a flexible metal strip 49 (see FIG. 1) may be used to form a seal between the support plate 42 and the cylindrical member 18.

The support plate 42 is provided with a plurality of perforations 50. As can be seen in both FIGS. 2 and 3, each perforation is adapted to receive the bottom portion 51 of a cylindrical insulator 52.

As is most clearly shown in FIG. 3, the bottom portion 51 of each insulator 52 is of reduced diameter forming an annular step 51a about insulator. When the portion 51 of the insulator is inserted in one of the perforations 50 in the support plate 42, the insulator is held in place by the abutment of the annular step 51a on the upper surface of the support plate (see FIG. 2).

The cylindrical insulators 52 may be made of any suitable material capable of withstanding high temperature. As is illustrated, in FIG. 3, each insulator is provided with a central perforation 53. Preferably, the central perforation is non-circular. For purposes of an exemplary showing, the insulator 52 is illustrated as having a substantially square perforation 53, with each corner being chamfered for additional strength.

The heater of the present invention is provided with a plurality of heating elements 54. These heating elements are in the form of elongated, open tubes, each tube having a longitudinally extending slot 55 (see FIG. 4). The heating elements 54 may be made of any suitable material known in the art, such as a nickel-chrome heating element alloy and may be formed into the proper configuration in any suitable manner as by drawing or the like.

The vertically oriented heating elements 54 are connected in series to form a structure of required resistance. Connection is accomplished by horizontal connector strips 56, located alternately between the bottom ends of an adjacent pair of elements 54 and the top ends of the next adjacent pair.

As illustrated in FIGS. 5 and 6, whereever possible the connector strips will be inserted in the slots 55 of an adjacent pair of heating elements 54 and welded or otherwise affixed in place. When insertion in the slots 55 of adjacent heating elements 54 is not possible, the connector strips 56 are simply butt welded to the exterior surfaces of the adjacent heating elements. Again, the connector strips may be made of any suitable material such as a nickel-chrome alloy.

Referring to FIGS. 2 and 5, the heating elements 54 are adapted to extend through the perforations 53 in the insulators 52. The hollow cylindrical heating elements 54 fit loosely within the non-circular perforations 53. This will permit the gas to be heated to flow downwardly through and on the outside of each heating element, thus eliminating hot spots which might occur if the heating elements 54 were not loosely fitted in the insulator perforations 53. The heating elements 54 are supported in place by the support plate 42 by virtue of the fact that those connector strips 56 located between the tops of the heating elements 54 rest on the top surfaces of the insulators 52. This is shown in the FIGS. 2 and 5.

When desired, the lower ends of the heating elements 54 may be provided with annular insulators, two of which are shown at 57 in FIG. 2. The insulators 57, together with those connector strips 56 located between the bottom ends of adjacent heating elements will tend to properly space the bottom ends of the heating elements. When desired, not all of the heating elements need be provided with insulators 57. For example, only about 50% of the outer and inner circle heating elements need be so provided.

From the above description, it will be evident to one skilled in the art, that the structure comprising the heating elements 54 and connector strips 56 will be substantially rigid mechanically, and will be free-hanging with respect to the support plate 42 and insulators 52. Any thermal expansion of this structure will be directed downwardly from the support plate 42, and, as will be evident from FIG. 1, can be readily accommodated in the heater chamber formed by the cylindrical element 18.

The heater chamber 20 formed by the element 18 is conventional. By virtue of the seal 49 between the element 18 and the support plate 42, substantially all of the gas to be heated must pass through or about the heating elements 54. As a result, the heater of the present invention provides a much greater heating area and a better heat transfer than the heating devices of the prior art. This is true despite the fact that that portion of the interior volume of the converter occupied by the heater is substantially the same as that occupied by prior art heaters of the pancake archimedean spiral arrangement, described above.

The heater assembly of the present invention may be wired in a number of different ways, dependent upon the circumstances of its use. For purposes of an exemplary but non-limiting showing, the heating device of the present invention is illustrated in FIGS. 2 and 8 as connected to a three-phase current supply. As illustrated in FIG. 8, the heating elements 54 are divided into three groups, each group covering a segment equal to about one-third of the area covered by the circular pattern of the layout of the heating elements. The three groups are generally indicated in FIG. 8 at 58, 59 and 60. Each group is connected to one phase of the conventional three-phase current supply as at 58a, 59a, 60a. Each group is also connected to a double ring connector 61 as at 58b, 59b and 60b. This is an example of a three-phase Y connected system wherein the common point (the double ring connector 61) of all three phases has a potential of zero. In such a system, a ground return line is not required.

The heater of the present invention, is further characterized by the fact that it has at least 50% less wattage loading per surface area than prior art heaters of the type described above. This lowering of the wattage loading is significant because it will tend to insure trouble free operation, extend or insure long life of the heater and will permit intermittent over-rating and/or over-voltage operation.

Modifications may be made in the invention without departing from the spirit of it. For example, the support plate 42 may be provided with a plurality of additional perforations between the perforations 50 so as to permit additional fluid passage about the exterior of the heating elements. An exemplary series of such additional perforations is shown at 62 in FIG. 7.

As indicated above, the heater of the present invention may be wired in a number of ways. It would be well within the skill of one in the art, for example, to wire the heater in such a way as to form a single phase unit.

The heater of the present invention is not limited to use in the vertical position. Modifications required to use the heater in the horizontal position, as for example, the provision of a second support means similar to support plate 42, would be within the skill of one in the art.

The embodiments of the invention in which an exclusive property or privilege is claimed are defined as follows:

1. A heater for heating fluids comprising at least one group of elongated, hollow heating elements, means for supporting said heating elements vertically in parallel spaced relationship, said support means comprising a horizontally oriented plate having a plurality of holes therein, a plurality of insulators, a portion of each insulator extending within one of said holes in said support plate, each of said insulators having a perforation therethrough, said elongated heating elements passing through said perforations in said insulators with their upper portions extending above said insulators and their lower portions extending below said support plate, said perforations in said insulators having cross sectional configurations different from the cross sectional configurations of said heating elements passing therethrough, whereby said fluid to be heated may pass both through said hollow heating elements and about the exterior of said heating elements through said perforations, means for causing said fluid to be heated to pass through and about the exterior of said heating elements, said heating elements of said group being connected in series by horizontal connector strips affixed alternately to said upper portions and said lower portions of adjacent ones of said heating elements in said series, said heating elements of said series comprising a free-hanging structure suspended from said support plate by contact between said insulators and those of said connector strips affixed to said upper portions of said heating elements, said group being connected to a source of electrical current.

2. The structure claimed in claim 1 wherein said heater is surrounded by means forming a heating chamber, said fluid to be heated passing through said chamber.

3. The structure claimed in claim 1 wherein said heater comprises the preheater for synthesis gas in a converter.

4. The structure claimed in claim 1 including three groups of said heating elements, the heating elements of each group being connected in series, said source of electrical current comprising a three-phase current supply, each of said groups being connected between one phase of said three-phase current supply and a common point having a zero potential.

5. The structure claimed in claim 1 wherein said heating elements are cylindrical in configuration and each of said heating elements has a longitudinal slot extending the length thereof.

6. The structure claimed in claim 1 wherein said support plate has additional holes between said holes receiving said insulators whereby to increase the fluid flow about said heating elements.

7. The structure claimed in claim 1 including annular insulators affixed about said lower portions of some at least of said heating elements whereby to aid in maintaining said parallel spaced relationships.

References Cited

UNITED STATES PATENTS

| | | | |
|---|---|---|---|
| 1,420,692 | 6/1922 | Cohen | 219—319 X |
| 1,712,372 | 5/1929 | Winship | 219—300 X |
| 1,727,585 | 9/1929 | Carleton | 219—298 X |
| 1,845,050 | 2/1932 | Lantz et al. | 23—199 |
| 2,619,579 | 11/1952 | Cartinhour | 219—374 X |
| 2,797,297 | 6/1957 | Nihlen | 219—381 X |
| 2,861,873 | 11/1958 | Worn | 23—198 X |
| 2,868,944 | 1/1959 | Koch et al. | 219—379 X |
| 3,270,182 | 8/1966 | Hynes | 219—307 X |

FOREIGN PATENTS

| | | |
|---|---|---|
| 1,293,413 | 4/1962 | France. |
| 673,305 | 6/1952 | Great Britain. |

ANTHONY BARTIS, Primary Examiner

U.S. Cl. X.R.

23—288; 219—307, 368, 376, 381